US012488674B2

(12) United States Patent
Sakushima et al.

(10) Patent No.: US 12,488,674 B2
(45) Date of Patent: Dec. 2, 2025

(54) INFORMATION PROCESSING SYSTEM AND INFORMATION PROCESSING METHOD

(71) Applicant: Panasonic Intellectual Property Management Co., Ltd., Osaka (JP)

(72) Inventors: Kazuo Sakushima, Kanagawa (JP); Akiko Takamiya, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 77 days.

(21) Appl. No.: 17/800,435

(22) PCT Filed: Mar. 1, 2021

(86) PCT No.: PCT/JP2021/007708

§ 371 (c)(1),
(2) Date: Aug. 17, 2022

(87) PCT Pub. No.: WO2021/177230

PCT Pub. Date: Sep. 10, 2021

(65) Prior Publication Data

US 2023/0079364 A1 Mar. 16, 2023

(30) Foreign Application Priority Data

Mar. 5, 2020 (JP) ................................ 2020-037913

(51) Int. Cl.
*G08B 21/22* (2006.01)

(52) U.S. Cl.
CPC .................................. *G08B 21/22* (2013.01)

(58) Field of Classification Search
CPC ...................................................... G08B 21/22
See application file for complete search history.

(56) References Cited

U.S. PATENT DOCUMENTS 4,259,548 A * 3/1981 Fahey ................. G08B 25/016 379/38
5,153,560 A * 10/1992 Ichikawa ........... G08B 13/1681 340/541
5,165,465 A * 11/1992 Kenet .................. G08B 19/005 236/94

(Continued)

FOREIGN PATENT DOCUMENTS

JP 2006-163929 A 6/2006
JP 5278797 B2 9/2013

(Continued)

OTHER PUBLICATIONS

International Search Report issued on May 18, 2021 in International Patent Application No. PCT/JP2021/007708, with English translation.

(Continued)

*Primary Examiner* — Steven Lim
*Assistant Examiner* — Son M Tang
(74) *Attorney, Agent, or Firm* — Rimon P.C.

(57) ABSTRACT

An information processing system includes: an obtainer that obtains request information for requesting presence/absence related information indicating presence or absence of a user in a building; and an outputter that outputs, in response to the request information obtained, the presence/absence related information identified by identification information included in the request information.

9 Claims, 16 Drawing Sheets

(56) References Cited

U.S. PATENT DOCUMENTS

| | | | | | |
|---|---|---|---|---|---|
| 5,309,146 | A * | 5/1994 | Kenet | G08B 13/19 340/567 |
| 5,905,436 | A * | 5/1999 | Dwight | G08B 21/0415 600/595 |
| 6,225,903 | B1 * | 5/2001 | Soloway | G08B 25/008 340/5.1 |
| 6,331,816 | B1 * | 12/2001 | Myllymaki | G08B 21/0423 340/541 |
| 6,445,298 | B1 * | 9/2002 | Shepher | G08B 13/1963 340/541 |
| 7,091,865 | B2 * | 8/2006 | Cuddihy | G08B 21/0423 340/539.22 |
| 7,242,305 | B2 * | 7/2007 | Cuddihy | G08B 21/0469 340/517 |
| 7,701,332 | B2 * | 4/2010 | Anderson | G08B 21/0453 340/8.1 |
| 8,682,952 | B2 * | 3/2014 | Kutzik | G16H 40/67 709/200 |
| 8,786,435 | B2 * | 7/2014 | Barnett | E05D 11/0081 340/541 |
| 8,894,576 | B2 * | 11/2014 | Alwan | A61B 5/7282 709/224 |
| 9,064,394 | B1 * | 6/2015 | Trundle | G08B 13/19684 |
| 9,836,936 | B1 * | 12/2017 | Brown | G06K 7/10356 |
| 9,997,045 | B2 * | 6/2018 | Warren | H04W 4/023 |
| 10,057,963 | B2 * | 8/2018 | Mead | G05B 15/02 |
| 10,269,233 | B2 * | 4/2019 | Fusakawa | G06Q 50/06 |
| 10,520,353 | B1 * | 12/2019 | Shi | G01G 19/52 |
| 10,825,318 | B1 * | 11/2020 | Williams | G16H 40/67 |
| 11,423,754 | B1 * | 8/2022 | Jordan, II | G08B 21/185 |
| 11,854,367 | B1 * | 12/2023 | Ulen | G06N 5/04 |
| 2005/0137465 | A1 * | 6/2005 | Cuddihy | G16H 50/20 128/920 |
| 2005/0181771 | A1 * | 8/2005 | Cuddihy | G08B 21/0423 455/414.1 |
| 2005/0225442 | A1 * | 10/2005 | Kanayama | G08B 25/008 340/539.13 |
| 2006/0033625 | A1 * | 2/2006 | Johnson | G06Q 40/08 705/2 |
| 2009/0256710 | A1 * | 10/2009 | Duckert | G08B 21/0484 340/573.1 |
| 2010/0097225 | A1 * | 4/2010 | Petricoin, Jr. | G07C 9/28 340/5.7 |
| 2010/0188218 | A1 * | 7/2010 | Roosli | G08B 21/22 340/545.1 |
| 2012/0299733 | A1 * | 11/2012 | Knibbe | H05B 47/13 340/573.1 |
| 2014/0247125 | A1 * | 9/2014 | Barsky | G06Q 10/00 340/539.12 |
| 2015/0308706 | A1 * | 10/2015 | Bunker | F24F 11/38 700/275 |
| 2015/0309487 | A1 * | 10/2015 | Lyman | G05B 15/02 700/275 |
| 2016/0171378 | A1 * | 6/2016 | Petersen | G06N 20/00 706/58 |
| 2016/0189529 | A1 * | 6/2016 | Lee | H04W 4/02 340/541 |
| 2016/0327921 | A1 * | 11/2016 | Ribbich | F24F 11/30 |
| 2017/0092102 | A1 * | 3/2017 | Fusakawa | G06Q 10/06 |
| 2017/0156028 | A1 * | 6/2017 | Kim | H04W 4/80 |
| 2018/0306609 | A1 * | 10/2018 | Agarwal | G06N 20/10 |
| 2019/0011268 | A1 * | 1/2019 | Ashar | G01S 17/04 |
| 2019/0051128 | A1 | 2/2019 | Yamashiro | |
| 2019/0220803 | A1 * | 7/2019 | Kanaoka | G07C 9/00571 |
| 2019/0287064 | A1 * | 9/2019 | Imai | G06Q 10/08355 |
| 2019/0385373 | A1 * | 12/2019 | Mittleman | G08B 29/18 |
| 2020/0072881 | A1 * | 3/2020 | Akai | G01R 21/133 |
| 2020/0193546 | A1 | 6/2020 | Kirihara et al. | |
| 2020/0252233 | A1 * | 8/2020 | O'Keeffe | H04L 12/2818 |
| 2021/0337244 | A1 * | 10/2021 | McCracken | H04N 21/2743 |

FOREIGN PATENT DOCUMENTS

| | | | |
|---|---|---|---|
| JP | 2017-062765 | A | 3/2017 |
| JP | 2019-066452 | A | 4/2019 |
| JP | 2019-185630 | A | 10/2019 |
| WO | 2017/145608 | A1 | 8/2017 |
| WO | 2018/193820 | A1 | 10/2018 |
| WO | 2019/049492 | A1 | 3/2019 |

OTHER PUBLICATIONS

Extended European Search Report dated Jun. 30, 2023 issued in the corresponding European Patent Application No. 21765041.5.

* cited by examiner

FIG. 7

| Control apparatus ID | Date | Day of week | Time period of day | Determination result | Weather |
|---|---|---|---|---|---|
| ctrl0001 | : | : | : | : | : |
| | 2019/12/17 | Tuesday | 13:00 - 15:00 | Present | Fine |
| | | | 15:00 - 16:00 | Absent | Fine |
| | | | : | : | : |
| | : | : | : | : | : |
| ctrl0002 | : | : | : | : | : |
| | 2019/12/17 | Tuesday | 11:00 - 18:00 | Present | Rain |
| | | | 18:00 - 18:30 | Absent | Rain |
| | | | : | : | : |
| | : | : | : | : | : |
| : | : | : | : | : | : |

FIG. 8

| Control apparatus ID | Address | Name | Age | Gender | Telephone number | E-mail address |
|---|---|---|---|---|---|---|
| ctrl0001 | 〒○×,Osaka·· ○○Condo 501 | △△ | ○○ | Male | • • • | • • • |
| ctrl0002 | 〒○△,Osaka·· ××Apartment 203 | □□ | ×× | Female | • • • | • • • |
| : | : | : | : | : | : | : |

INFORMATION PROCESSING SYSTEM AND INFORMATION PROCESSING METHOD

CROSS-REFERENCE OF RELATED APPLICATIONS

This application is the U.S. National Phase under 35 U.S.C. § 371 of International Patent Application No. PCT/JP2021/007708, filed on Mar. 1, 2021, which in turn claims the benefit of Japanese Patent Application No. 2020-037913, filed on Mar. 5, 2020, the entire disclosures of which applications are incorporated by reference herein.

TECHNICAL FIELD

The present invention relates to an information processing system and an information processing method.

BACKGROUND ART

A technique of detecting a person present in a building is known. Patent Literature (PTL) 1 discloses an identification system capable of identifying, using a transmitter, whether a person present in a predetermined area of a facility is a person registered in advance.

CITATION LIST

Patent Literature

[PTL 1] International Publication No. 2017/145608

SUMMARY OF INVENTION

Technical Problem

The present invention provides an information processing system and an information processing method which can provide information related to whether a person is present in a building.

Solution to Problem

An information processing system according to one aspect of the present invention includes an obtainer that obtains request information for requesting presence/absence related information indicating presence or absence of a user in a building; and an outputter that outputs, in response to the request information obtained, the presence/absence related information identified by identification information included in the request information.

An information processing method according to one aspect of the present invention includes: obtaining request information for requesting presence/absence related information indicating presence or absence of a user in a building; and outputting, in response to the request information obtained, the presence or absence related information identified by identification information included in the request information.

A recording medium according to one aspect of the present invention is a non-transitory computer-readable recording medium for use in a computer, the recording medium having a computer program recorded thereon for causing the computer to execute the above-described information processing method.

Advantageous Effects of Invention

The information processing system and the information processing method according to one aspect of the present invention can provide information related to whether a person is present in a building.

BRIEF DESCRIPTION OF DRAWINGS

FIG. 7 is a diagram illustrating an example of determination result information.

FIG. 8 is a diagram illustrating an example of user registration information.

DESCRIPTION OF EMBODIMENTS

Hereinafter, embodiments will be described in detail with reference to the Drawings. It should be noted that the embodiments described below each show a general or specific example. The numerical values, shapes, materials, structural components, the arrangement and connection of the structural components, steps, the processing order of the steps, and so on, shown in the following embodiments are mere examples, and therefore do not limit the present invention. Among the structural components in the embodiments described below, those not recited in the independent claims will be described as optional constituent elements.

In addition, each diagram is a schematic diagram and not necessarily strictly illustrated. In each of the diagrams, substantially the same structural components are assigned with the same reference signs, and there are instances where redundant descriptions are omitted or simplified.

Embodiment

Configuration of Watching Over System

Figure 1:
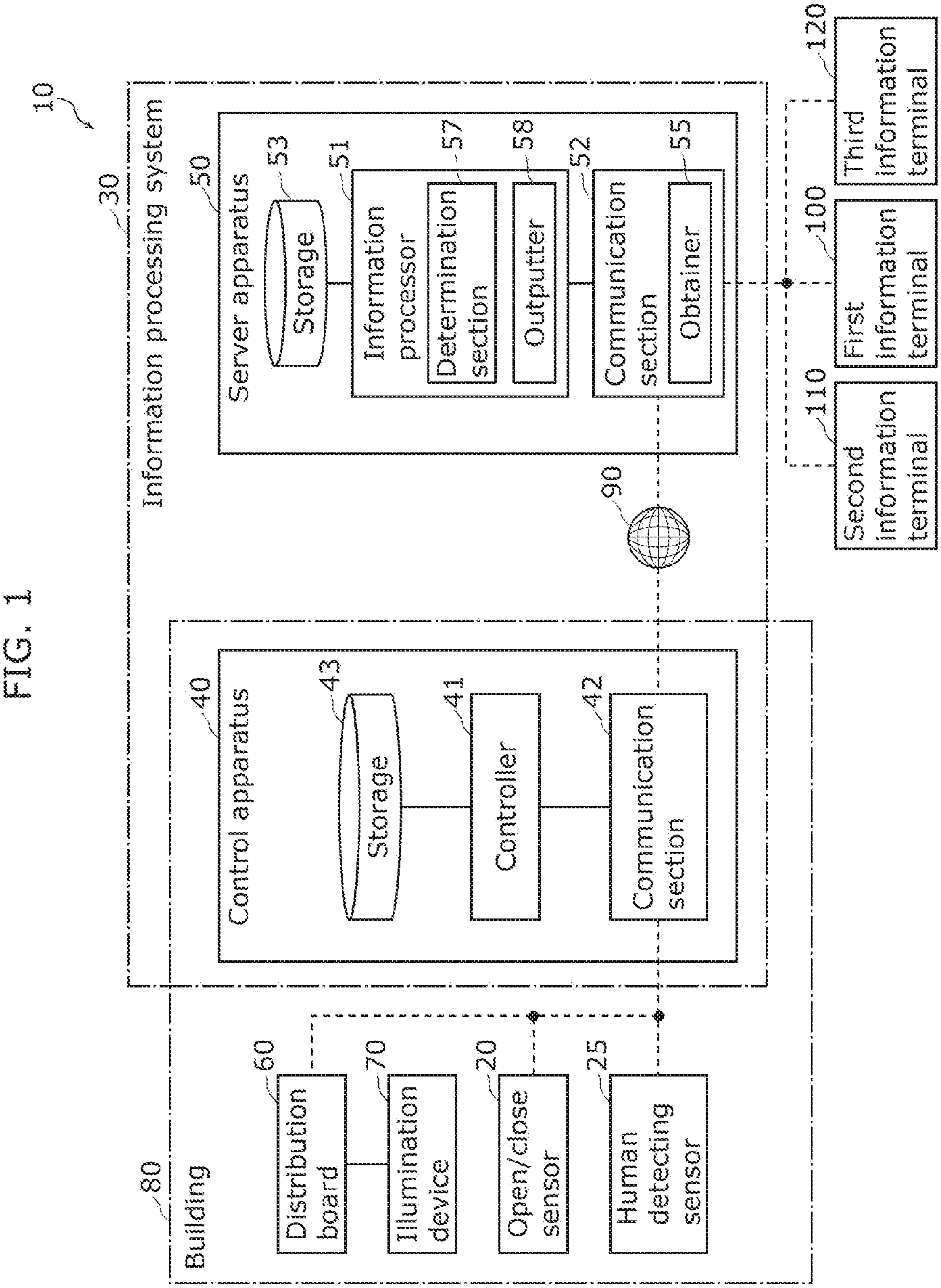
FIG. 1 is a block diagram illustrating a functional configuration of a watching over system according to an embodiment.

First, a watching over system according to an embodiment will be described. FIG. 1 is a block diagram illustrating a functional configuration of a watching over system according to the embodiment.

As illustrated in FIG. 1, watching over system 10 according to the embodiment includes: open/close sensor 20; human detecting sensor 25; information processing system 30; distribution board 60; illumination device 70; first information terminal 100; second information terminal 110; and third information terminal 120. Information processing system 30 includes control apparatus 40 and server apparatus 50. Among the structural components included in watching over system 10, the structural components other than server apparatus 50, first information terminal 100, second information terminal 110, and third information terminal 120 are disposed in building 80. Building 80 is, for example, a housing such as a complex housing or a detached house, but may also be a nursing home, a hospital, or the like.

In watching over system 10, a user who lives in building 80 is an elderly person, for example. The user who lives a normal life in building 80 turns on and off a device (in other words, electrical equipment) such as illumination device 70 disposed in building 80. In other words, when a user lives a normal life in building 80, there will be a certain degree of variation in electricity usage in building 80. Information processing system 30 included in watching over system 10 detects a variation in the electricity usage in building 80, by using a measurement function of distribution board 60 for the electricity usage, and is thereby capable of determining whether a user is living a normal life.

When the variation in the electricity usage is small, information processing system 30 determines that some sort of anomaly (e.g., anomalous health condition) has occurred to the user, such as the case where the user is collapsing in building 80, and transmits notification information to notify first information terminal 100 used by a provider who provides the watching over service, for example, that an anomaly has occurred to the user. As a result, a visitor is arranged to visit building 80, by the operator, etc. of the provider who provides the watching over service. In addition, information processing system 30 is also capable of directly notifying a family member of the user (e.g., a family member who lives in a distant location away from the user), by transmitting second notification information to second information terminal 110 used by the family member of the user.

The variation of the electricity usage in building 80 is also likely to be small when the user goes out and absent from building 80. Therefore, it is required to establish a mechanism that prevents mistakenly determining that an anomaly has occurred to a user when the user is out of building 80.

In view of the above, information processing system 30 determines whether the user goes out and absent from building 80, based on a result of detection performed by open/close sensor 20 and human detecting sensor 25 that are disposed at a doorway of building 80. In this manner, watching over system 10 is capable of enhancing the accuracy of determining whether an anomaly has occurred to the user. The following describes each of the structural components included by watching over system 10 as described above.

Open/Close Sensor and Human Detecting Sensor

Figure 2:
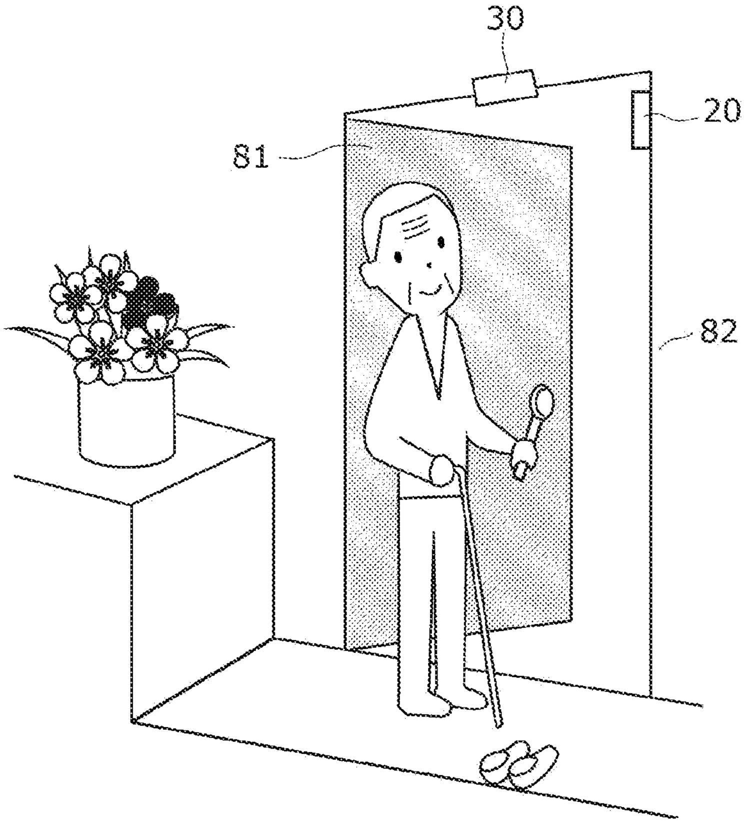
FIG. 2 is a diagram illustrating an example of disposing of an open/close sensor and a human detecting sensor.

First, open/close sensor 20 and human detecting sensor 25 will be described. FIG. 2 is a diagram illustrating an example of disposing of open/close sensor 20 and human detecting sensor 25.

Open/close sensor 20 detects the opening and closing of door 81 disposed at the doorway of building 80, and outputs first information indicating a result of the detection. Open/close sensor 20 is a magnetic sensor that is implemented by a magnet attached to one of door 81 and door frame 82 and a magnet sensor attached to the other of door 81 and door frame 82. Open/close sensor 20 may be a radio wave type sensor implemented by a radio-frequency identification (RFID) tag attached to one of door 81 and door frame 82 and an RFID reader attached to the other of door 81 and door frame 82, and the specific aspect of open/close sensor 20 is not particularly limited. It should be noted that door 81 is, for example, an entrance door, but door 81 may also be a back door, or the like.

Human detecting sensor 25 is disposed in building 80, and detects the presence or absence of a person in a detection range. In addition, human detecting sensor 25 outputs second information indicating a result of detection performed by human detecting sensor 25. Human detecting sensor 25 is implemented, for example, by a pyroelectric sensor that reacts to an infrared ray emitted from a human body, but may also be an ultrasonic human detecting sensor, etc. The specific aspect of human detecting sensor 25 is not particularly limited. In the example illustrated in FIG. 2, human detecting sensor 25 is disposed at the entrance in building 80 (more specifically, on the interior side of door frame 82). However, it is sufficient so long as human detecting sensor 25 is disposed inside building 80

Control Apparatus

Control apparatus 40 is, for example, a home energy management system (HEMS) controller that has an energy management function. Control apparatus 40 is disposed in building 80, and manages the power consumption of the devices disposed in building 80. In addition, control apparatus 40 obtains the status of devices and controls the devices disposed in building 80 (or on the premises of building 80). Control apparatus 40 is provided, for example, by a provider such as a home appliance manufacturer. Control apparatus 40 is not limited to the HEMS controller, but may be any other home controller or gateway device. Control apparatus 40 includes controller 41, communication section 42, and storage 43.

Controller 41 performs control related to control apparatus 40. Controller 41 is implemented by a microcomputer, for example, but may also be implemented by a processor or dedicated circuitry.

Communication section 42 is a communication circuit for control apparatus 40 to communicate with open/close sensor 20, human detecting sensor 25, server apparatus 50, and distribution board 60. Communication section 42 is, for example, a wireless communication circuit that performs wireless communication, but may also be a wired communication circuit that performs wired communication. There is no particular limitation on the communication standard for the communication performed by communication section 42. Communication section 42, for example, uses a local communication network when communicating with open/close sensor 20, human detecting sensor 25, and distribution board 60, and uses wide area communication network 90 such as the Internet when communicating with server apparatus 50.

Storage 43 is a storage device in which a control program or the like to be executed by controller 41 is stored. Storage 43 is implemented, for example, by a semiconductor memory.

Server Apparatus

Server apparatus 50 performs information processing, such as determining whether a user goes out and absent from building 80, whether an anomaly has occurred to the user, and the like. Server apparatus 50 is provided, for example, by the above-described home appliance manufacturer, but may also be provided by any other providers. Server apparatus 50 includes information processor 51, communication section 52, and storage 53.

Information processor 51 performs information processing, such as determining whether a user goes out and absent from building 80, whether an anomaly has occurred to the user, and the like. Information processor 51 specifically includes determination section 57 and outputter 58. Information processor 51 is implemented by a microcomputer, for example, but may also be implemented by a processor or dedicated circuitry.

Communication section 52 is a communication circuit for server device 50 to communicate with control apparatus 40, first information terminal 100, and second information terminal 110. Communication section 52 is also capable of communicating with open/close sensor 20 and human detecting sensor 25 via control apparatus 40. Communication section 52 specifically includes obtainer 55. There is no particular limitation on the communication standard for the communication performed by communication section 52.

Storage 53 is a storage device in which a program or the like to be executed by information processor 51 is stored. Storage 53 is implemented, for example, by a semiconductor memory.

Distribution Board and Illumination Device

Distribution board 60 is a device that measures the electricity usage (in other words, the power consumption) in building 80 for each branch circuit, and transmits to control unit 40 electricity usage information indicating the electricity usage that has been measured. If a device, such as illumination device 70, that is turned on and off by a user in the course of living a normal life is connected to a branch circuit, it is possible to determine the presence or absence of anomaly of the user, by monitoring the electricity usage information of the branch circuit.

It should be noted that distribution board 60 is an example of a device that is capable of measuring the electricity usage of devices such as illumination device 70, and control apparatus 40 is also capable of obtaining electricity usage information by communicating with devices other than distribution board 60 that are capable of measuring the electricity usage of devices. An example of the other devices is a smart meter (in other words, an electricity meter provided with a communication function), for example.

First Information Terminal, Second Information Terminal, and Third Information Terminal First information terminal 100 is an information terminal used by a provider who provides the watching over service to receive notification information transmitted by server apparatus 50. First information terminal 100 is a stationary information terminal such as a personal computer, for example, but may also be a portable information terminal, such as a smartphone or a tablet terminal.

Second information terminal 110 is an information terminal used by a family member of the user to receive the notification information transmitted by server apparatus 50. Second information terminal 110 is a portable information terminal, such as a smartphone or a tablet terminal, for example, but may also be a stationary information terminal such as a personal computer.

Third information terminal 120 is, when information processing system 30 functions as an information providing system that provides information on the presence or absence of a person (user) in building 80 (described later), an information terminal that is used to receive the information. Third information terminal 120 is a portable information terminal, such as a smartphone or a tablet terminal, for example, but may also be a stationary information terminal such as a personal computer.

Example 1 of the Operation of Determining the Presence or Absence of a Person

Figure 3:
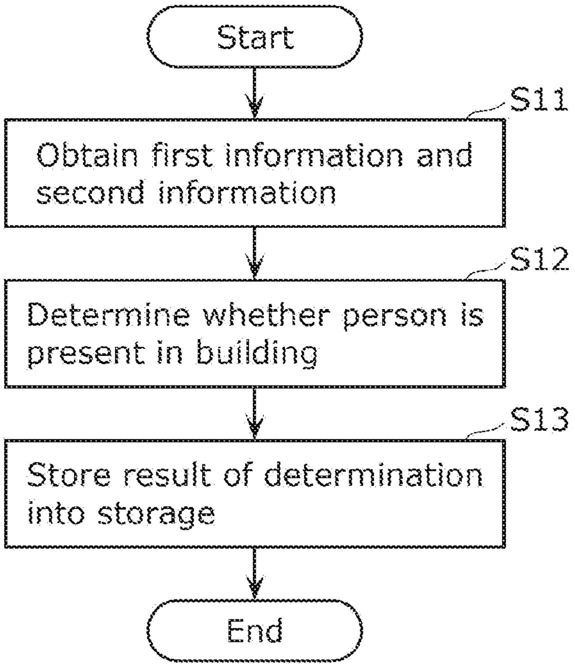
FIG. 3 is a flowchart of Example 1 of an operation to determine the presence or absence of a person.

The following describes the operation of determining the presence or absence of a person (user) in building 80. FIG. 3 is a flowchart of Example 1 of an operation of determining the presence or absence of a person.

First, obtainer 55 of server apparatus 50 obtains the first information indicating a result of detection by open/close sensor 20 and the second information indicating a result of detection by human detecting sensor 25 (S11). The first information and the second information are obtained via control apparatus 40.

The first information is, more specifically, information indicating whether door 81 is in an opened state or in a closed state. Time information (in other words, a time stamp) is added to the first information by controller 41 when the first information is relayed to server apparatus 50 (obtainer 55) by control apparatus 40. It should be noted that the time information may be added to the first information by open/close sensor 20 or by server apparatus 50.

The second information is, more specifically, information indicating whether a person is present in the detection range of human detecting sensor 25. In the following description, the state in which the presence of a person is detected by human detecting sensor 25 is also described as the state in which human detecting sensor 25 has reacted. Time information (in other words, a time stamp) is added to the second information by controller 41 when the second information is relayed to server apparatus 50 (obtainer 55) by control apparatus 40. It should be noted that the time information may be added to the second information by human detecting sensor 25 or by server apparatus 50.

Figure 4:
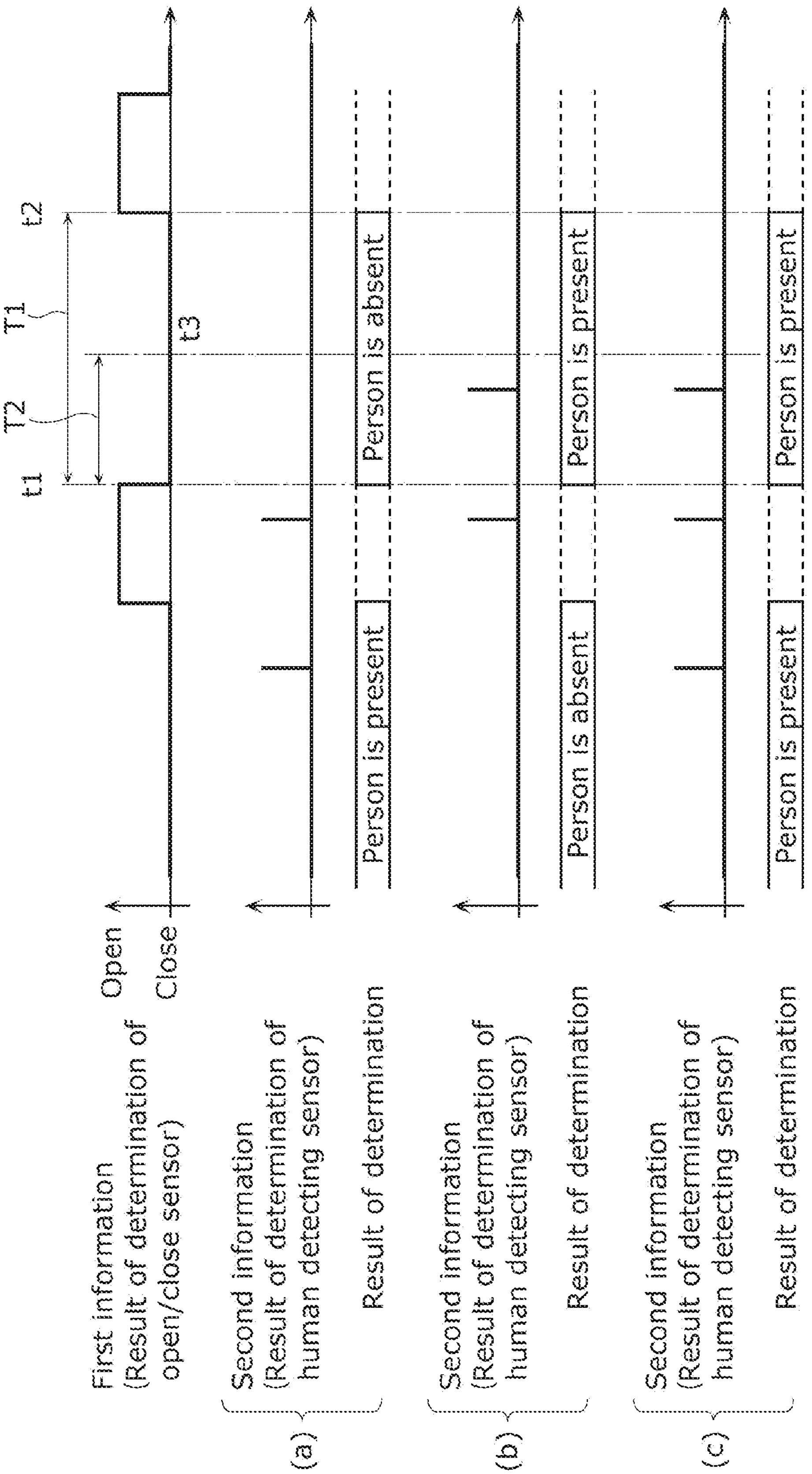
FIG. 4 is a time chart indicating a specific example of determination of the presence or absence of a person.

Next, determination section 57 determines whether a person is present in building 80, based on the first information and second information that have been obtained (S12). In addition, determination section 57 stores the result of the determination performed in Step S12 into storage 53 (S13). FIG. 4 is a time chart illustrating an example of the specific determination performed in Step S12.

It should be noted that, in FIG. 4, the relationship between the first information, the second information, and the result of determination is indicated. In FIG. 4, the first information indicates that door 81 is in an opened state at a high level, and door 81 is in a closed state at a low level. The second information indicates that a person is present in the detection range of human detecting sensor 25 (i.e., human detecting sensor 25 is detecting and reacting to a person) at a high level, and that no person is present in the detection range of human detecting sensor 25 (i.e., human detecting sensor 25 is not reacting) at a low level.

FIG. 4 indicates, in (a), the relationship between the first information, the second information, and the result of determination, when a person in building 80 goes outside building 80 and no person is present in building 80. As illustrated in (a) in FIG. 4, when a person in building 80 goes out, human detecting sensor 25 does not react at and after first timing t1 at which door 81 transitions from the opened state to the closed state. Here, if the period from first timing t1 at which door 81 transitions from the opened state to the closed state to second timing t2 at which door 81 transitions to the opened state next is defined as first period T1, determination section 57 is capable of identifying first period T1 based on the first information. Determination section 57 determines that no person is present in building 80 during first period T1, when the second information indicates that human detecting sensor 25 has not reacted during first period T1, as indicated in (a) in FIG. 4.

FIG. 4 indicates, in (b), the relationship between the first information, the second information, and the result of determination, when a person outside building 80 enters building 80 in which no person is present. As illustrated in (b) in FIG. 4, when a person outside building 80 enters building 80, human detecting sensor 25 reacts at and after first timing t1 at which door 81 transitions from the opened state to the closed state. Determination section 57 determines that a person is present in building 80 during first period T1, when the second information indicates that human detecting sensor 25 has reacted during first period T1, as indicated in (b) in FIG. 4.

FIG. 4 indicates, in (c), the relationship between the first information, the second information, and the result of determination, when a person in building 80 attends to a visitor and then goes back to the inside of building 80. As illustrated in (c) in FIG. 4, when a person inside building 80 attends to a visitor, human detecting sensor 25 reacts at and after first timing t1 at which door 81 transitions from the opened state to the closed state. Determination section 57 determines that a person is present in building 80 during first period T1, when the second information indicates that human detecting sensor 25 has reacted during first period T1, as indicated in (c) in FIG. 4.

As described above, watching over system 10 is capable of determining the presence or absence of a person inside building 80, using results of detection of open/close sensor 20 and human detecting sensor 25 disposed at the doorway of building 80.

In addition, determination section 57 is also capable of determining (detecting) going out and coming back of a person. As illustrated in (a) in FIG. 4, for example, determination section 57 is capable of determining that a person goes out from building 80 when the second information indicates that human detecting sensor 25 has not reacted during first period T1 immediately after that it is determined that no person is present in building 80.

As illustrated in (b) in FIG. 4, for example, determination section 57 is capable of determining that a person comes back into building 80 when the second information indicates that human detecting sensor 25 has reacted during first period T1 immediately after that it is determined that a person is present in building 80.

It should be noted that, although the first information does not define a result of determination for the period during which door 81 is in the opened state in the example illustrated in FIG. 4, the result of determination during this period may be considered to be the same as a result of determination for the period immediately preceding the period or may be considered to be the same as a result of determination for the period immediately after the period.

In addition, in Example 1 of the operation of determining the presence or absence of a person, it is determined that a person is present in building 80 if human detecting sensor 25 reacts at least once during first period T1. However, the requirement for determining that a person is present may be that human detecting sensor 25 reacts a plurality of times (in other words, at least twice) during first period T1. In this manner, it is possible to inhibit false determination that a person is present. As described above, determination section 57 is capable of determining the presence or absence of a person based on whether the number of times human detecting sensor 25 reacted during first period T1 is greater than or equal to a predetermined number of times (the predetermined number of times is once, or twice or more).

Figure 5:
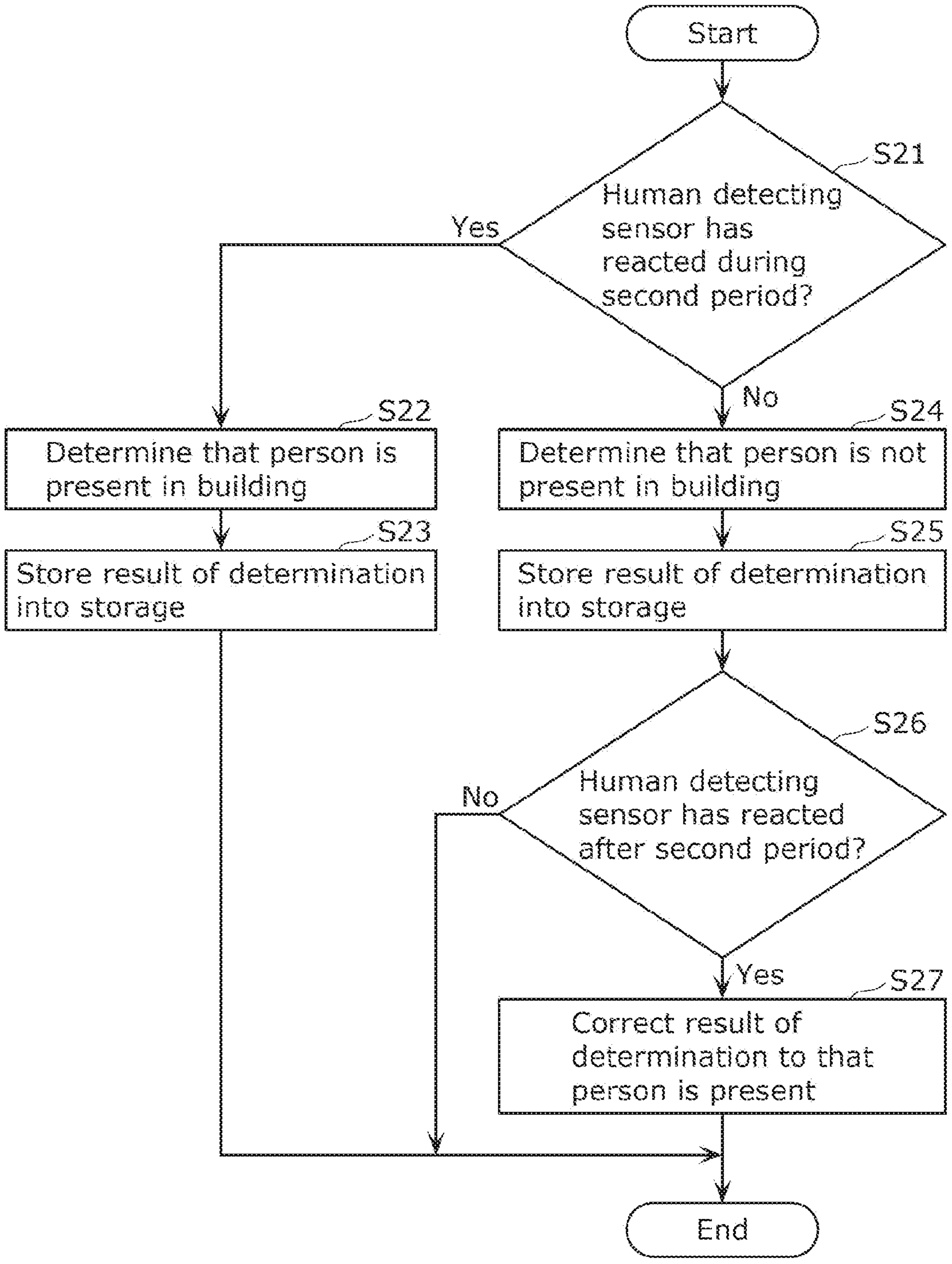
FIG. 5 is a flowchart of Example 2 of an operation to determine the presence or absence of a person.

Example 2 of the Operation of Determining the Presence or Absence of a Person It should be noted that, as illustrated in (b) in FIG. 4, the determination that a person is present in building 80 in first period T1 is confirmed when human detecting sensor 25 reacts at or after first timing t1. On the other hand, as illustrated in (a) in FIG. 4, the determination that no one is present in building 80 in first period T1 is confirmed at second timing t2. In other words, when human detecting sensor 25 does not react at or after first timing t1, the determination of absence is not confirmed until second timing t2 at which door 81 opens next. For this reason, there is a possibility that determination section 57 cannot provide the result of determination of the presence or absence of a person in a timely manner. In view of the above, determination section 57 may perform the determination for first timing t1 to third timing t3 (illustrated in FIG. 4) at which several seconds to several tens of seconds have elapsed from first timing t1. FIG. 5 is a flowchart of Example 2 of an operation of determining the presence or absence of a person.

At third timing t3 which is before second timing t2, determination section 57 determines whether human detecting sensor 25 has reacted during second period T2 (illustrated in FIG. 4) from first timing t1 to third timing t3 (S21). The length of second period T2 is, for example, 5 seconds, but may be several seconds to several tens of seconds.

When human detecting sensor 25 has reacted during second period T2 (Yes in S21), determination section 57 determines that a person is present in building 80 during first period T1 (S22) and stores the result of determination in storage 53 (S23). On the other hand, when human detecting sensor 25 has not reacted during second period T2 (No in S21), determination section 57 determines that no one is present in building 80 during first period T1 (S24) and stores the result of determination in storage 53 (S25).

In this manner, determination section 57 may confirm the determination of presence or absence at third timing t3 that is a relatively early timing. In this case, human detecting sensor 25 may be disposed in proximity to door 81 such that human detecting sensor 25 reacts as early as possible after door 81 is closed when a person is present in building 80.

It should be noted that, after determining the absence at third timing t3 (in other words, after storing the result of determination in storage 53), determination section 57 may continue to monitor the second information of human detecting sensor 25 until second timing t2 and further determine whether human detecting sensor 25 has reacted during the period from third timing t3 to second timing t2 (S26).

When it is determined that human detecting sensor 25 has reacted during this period (Yes in S26), determination section 57 corrects, at the time when human detecting sensor 25 has reacted, the result of determination in first period T1 to a result of determination that a person is present (S27). In other words, when the second information indicates that human detecting sensor 25 has reacted during the period from the time when the result of determination is stored to second timing t2, determination section 57 corrects the result of determination stored in storage 53 to the result of determination that a person is present in building 80.

On the other hand, when human detecting sensor 25 has not reacted during the above-described period (No in S26), determination section 57 terminates the operation without correcting the result of determination.

In this manner, determination section 57 may immediately correct the result of determination when the result of determination is likely to be erroneous, while determining the result of determination at an early stage.

In Example 2 of the operation of determining the presence or absence of a person, when human detecting sensor 25 has reacted at least once during second period T2 (or any subsequent period), it has been determined that a person is present in building 80. However, the requirement for determining that a person is present may be that human detecting sensor 25 has reacted a plurality of times during second period T2 (or any subsequent period). In this manner, it is possible to inhibit false determination that a person is present. As described above, determination section 57 is capable of determining the presence or absence of a person based on whether the number of times human detecting sensor 25 has reacted during second period T2 (or any subsequent period) is greater than or equal to a predetermined number of times (the predetermined number of times is one or more times).

Watching Over Operation

Figure 6:
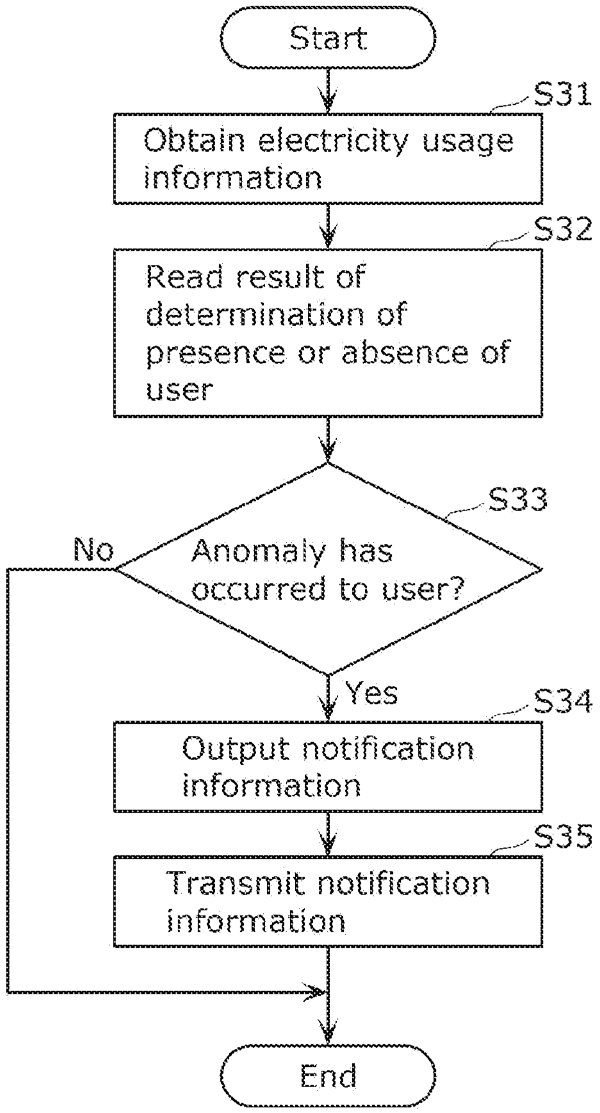
FIG. 6 is a diagram illustrating an example of a flowchart of a watching over operation.

The following describes a watching over operation using a result of determination of the presence or absence of a person (user) as described above. FIG. 6 is a diagram illustrating an example of a flowchart of the watching over operation.

First, obtainer 55 of server apparatus 50 obtains electricity usage information indicating the electricity usage in building 80 from control apparatus 40 (S31). The electricity usage information that has been obtained is stored, for example, in storage 53. As described above, control apparatus 40 manages the electricity usage information of illumination device 70 and other devices connected to distribution board 60, and is capable of providing such electricity usage information to server apparatus 50. It should be noted that information that varies (turned on and off) only when a user lives a normal life in the building is suitable for the electricity usage information that is used in watching over the user, such as the electricity usage information of illumination device 70, rather than information that varies regardless of the behavior of the user, such as the electricity usage information of a refrigerator.

Next, outputter 58 reads the result of determination of the presence or absence of the user that is stored in storage 53 (S32), and determines whether an anomaly has occurred to the user, based on the electricity usage information that has been obtained in Step S31 and the result of determination of the presence or absence of the user that has been read in Step S32 (S33).

For example, outputter 58 determines that an anomaly has occurred to the user (Yes in S33) and outputs notification information (S34) when the result of the determination of the presence or absence of the user indicates that the user is present in building 80 and the variation range of the electricity usage indicated by the electricity usage information is less than a predetermined value. In addition, in other cases, outputter 58 determines that no anomaly has occurred to the user (No in S33) and does not output notification information.

The above-described notification information is used to inform that it is determined that an anomaly has occurred to the user. Communication section 52 transmits the notification information output by outputter 58 to first information terminal 100 (S35). It should be noted that the electricity usage information and the result of determination of the presence or absence of a person are managed in association with the ID of control apparatus 40 in storage 53, and the ID of control apparatus 40 is included in the notification information.

As described above, first information terminal 100 is used by an operator of the provider who provides the watching over service. For example, when user information in which the ID of control apparatus 40 and the personal information of the user (specifically, name, gender, age, address of building 80, telephone number, contact information of a family member of the user, ID of second information terminal 110 used by the family member of the user, etc.) is associated is stored in the storage (not illustrated) of first information terminal 100, first information terminal 100 is capable of identifying the user to whom an anomaly has been determined to have occurred, based on the ID of control apparatus 40 included in the notification information. Then, the operator using first information terminal 100 can take action in response to the notification information. For example, the operator can take action in response to the occurrence of an anomaly, such as dispatching a visitor to building 80.

The notification information may be transmitted to second information terminal 110 in addition to or instead of first information terminal 100. For example, when information in which the ID of control apparatus 40 and the ID of second information terminal 110 are associated with each other is stored in storage 53, communication section 52 is capable of transmitting the notification information output by outputter 58 to second information terminal 110 used by the family member of the user. In this manner, the family member of the user is notified that an anomaly has occurred to the user.

When the result of determination of the presence or absence of the user is used in watching over system 10, it is possible to inhibit to mistakenly determine that an anomaly has occurred to the user when the user is out of building 80 and is not present in building 80. In other words, when the result of determination of the presence or absence of the user is used in watching over system 10, it is possible to improve the accuracy of determining whether an anomaly has occurred to the user.

Example 1 of Information Providing Operation

As described above, the result of determination of the presence or absence of a person is stored in association with the ID of control apparatus 40, in server apparatus 50 of information processing system 30. Here, server apparatus 50 is capable of storing, in storage 53, the result of determination of the presence or absence of a user (hereinafter also referred to as determination result information) in each of a plurality of buildings, by also obtaining the first information and the second information from control apparatus 40 disposed in other buildings. FIG. 7 is a diagram illustrating an example of the determination result information.

It should be noted that, in the example illustrated in FIG. 7, the result of determination of the presence or absence of a user is also associated with the weather information at that time. Server apparatus 50 is capable of including weather information in the determination result by, for example, querying the other server apparatuses that manage weather information. The weather information may include temperature information.

In addition, user registration information in which the ID of control apparatus 40 is associated with the personal information of the user is stored in storage 53, based on user registration, etc. performed when control apparatus 40 is introduced in building 80. FIG. 8 is a diagram illustrating an example of the user registration information. In the user registration information illustrated in FIG. 8, the ID of control apparatus 40 is associated with the user's attribute information. The user's attribute information, specifically, includes the user's name, the user's gender, the user's age, the address of building 80, the telephone number, and the e-mail address, etc.

Figure 9:
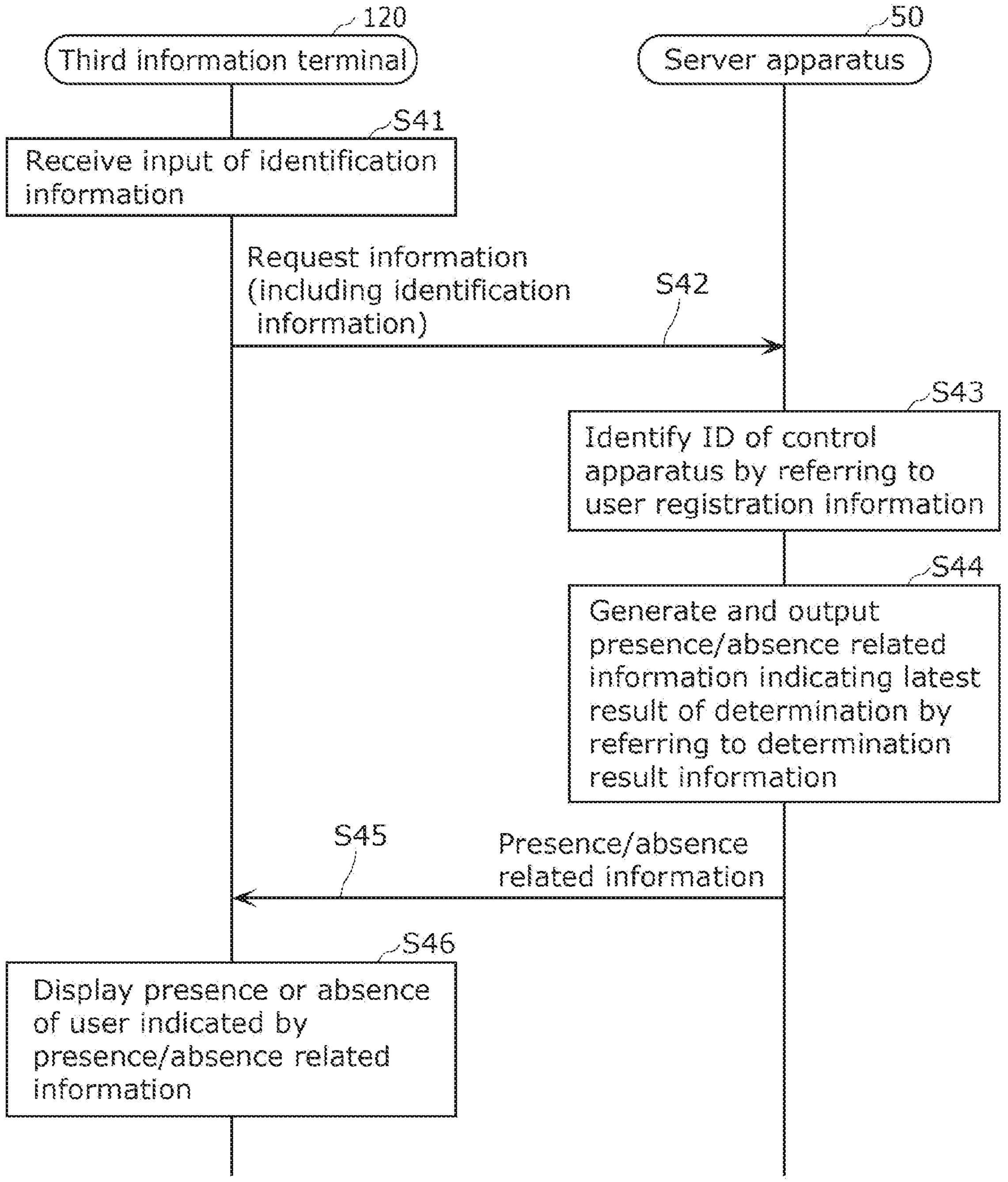
FIG. 9 is a sequence diagram of Example 1 of an information providing operation of the information processing system according to the embodiment.

Information processing system 30 is also capable of functioning as an information providing system that uses such determination result information and user registration information to provide the result of determination of the presence or absence of the user as information. Hereinafter, the information providing operation of information processing system 30 will be described. FIG. 9 is a sequence diagram of Example 1 of the information providing operation of information processing system 30. The explanation of FIG. 9 below describes an example in which the result of determination of the presence or absence of the user is provided from information processing system 30 to third information terminal 120 (more specifically, a portable terminal such as a smartphone) used by a delivery person of a courier service provider.

First, by operating third information terminal 120, the delivery person of the delivery service provider enters at least one piece of identification information, such as the name of the user to whom a package is to be delivered, the telephone number of the user, the delivery address of the package (i.e., building 80), or the like, and third information terminal 120 receives the entry of such identification information from the delivery person (S41). It is sufficient if the identification information enables distinguishing the user or building 80 from the others.

After the identification information is entered, third information terminal 120 transmits request information including the identification information that has been entered, to server apparatus 50 (S42). The request information here is, in more detail, information for requesting presence/absence related information that indicates the presence or absence of the user in building 80. It should be noted that the presence/absence related information need not definitively indicate the presence or absence of the user, but may indicate the presence or absence of the user statistically, such as "present with probability of XX %" as described below, or may indicate an estimated result.

When the request information is obtained by obtainer 55, outputter 58 of server apparatus 50 identifies the identification information included in the request information, and identifies the ID of control apparatus 40 associated with the identification information that has been identified, by referring to the user registration information stored in storage 53 (S43).

Next, outputter 58 generates and outputs presence/absence related information indicating the latest one of the results of determination of the presence or absence of the user associated with the ID of control apparatus 40 that has been identified by referring to the determination result information stored in storage 53 (S44). In other words, outputter 58 outputs the presence/absence-related information indicating the presence or absence of the user in building 80 at the timing when the request information is obtained. Here, the result of determination of the presence or absence of the user at the timing when the request information is obtained is not meant in a strict sense, but rather as the determination of the presence or absence of the user at the timing that is closest to the timing when the request information is obtained (i.e., the latest result of determination of the presence or absence of the user).

Figure 10:
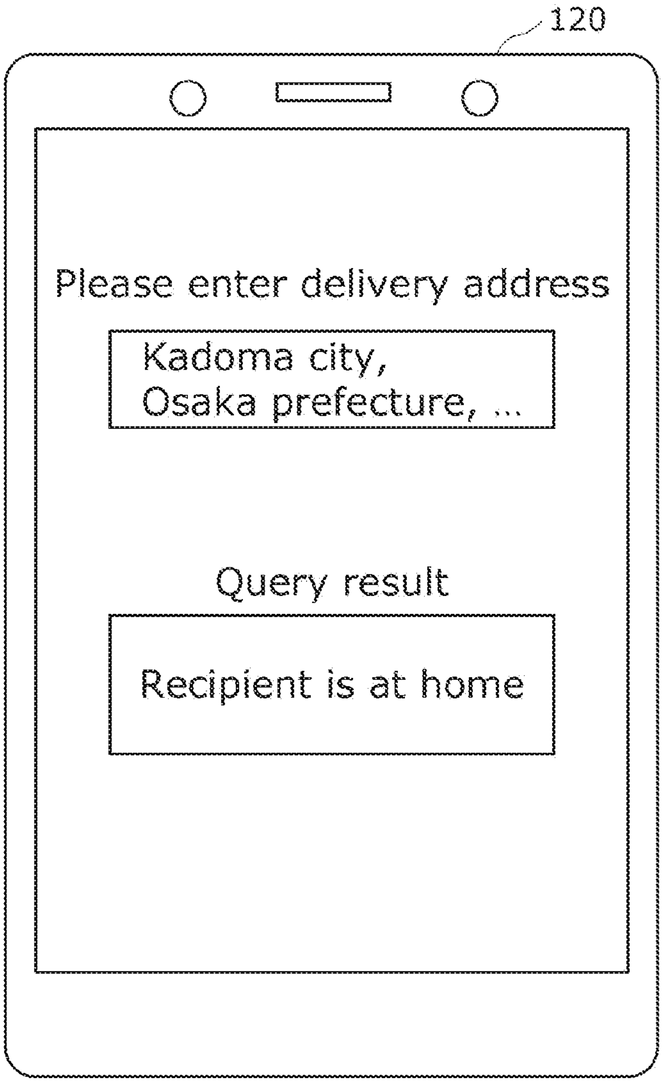
FIG. 10 is a diagram illustrating an example of an image displayed on a third information terminal in Example 1 of the information providing operation.

Next, communication section 52 transmits the presence/absence related information that has been output by outputter 58, to third information terminal 120 (S45). When the presence/absence related information is received, third information terminal 120 displays the presence or absence of the user indicated by the presence/absence related information on the display section included in third information terminal 120 (S46). FIG. 10 is an example of an image displayed on the display section included in third information terminal 120.

As described above, information processing system 30 is capable of providing third information terminal 120 with presence/absence related information indicating the presence or absence of the user in building 80 at the timing the request information is obtained.

Example 2 of Information Providing Operation

Figure 11:
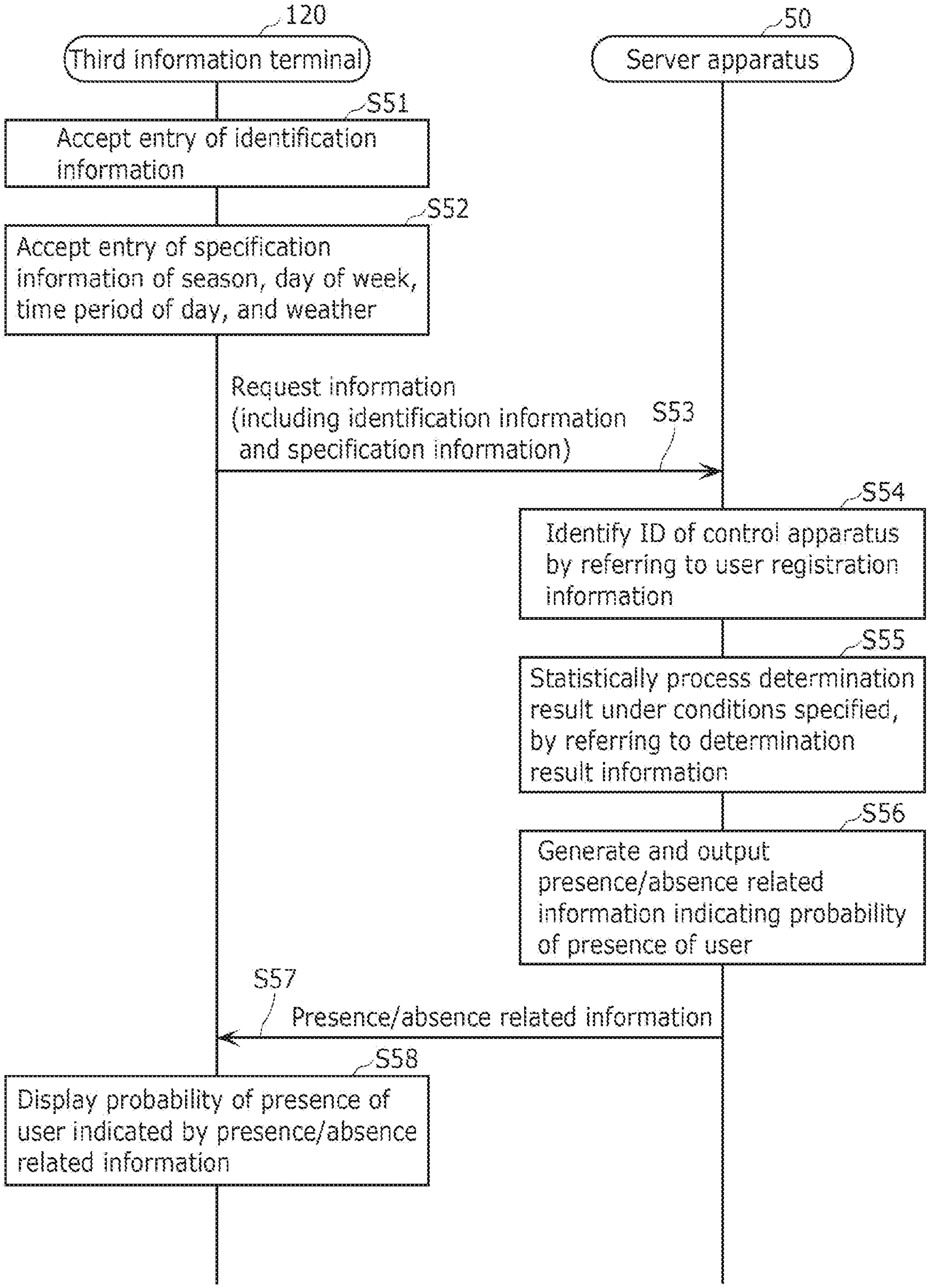
FIG. 11 is a sequence diagram of Example 2 of the information providing operation of the information processing system according to the embodiment.

In Example 1 of the above-described information providing operation, presence/absence related information indicating the presence or absence of the user in building 80 at the timing when the request information is obtained has been output, but presence/absence related information indicating the presence or absence of the user under specified conditions may also be output. For example, presence/absence related information indicating the probability of the presence or absence of the user at the specified day of week and the time period of a day may be output. FIG. 11 is a sequence diagram of Example 2 of the information providing operation of such information processing system 30.

First, the delivery person of the delivery service provider enters at least one piece of identification information by operating third information terminal 120, and third information terminal 120 accepts the entry of such identification information from the delivery person (S51). In addition, the delivery person of the delivery service provider enters specification information that specifies each condition of a season, a day of the week, a time period of a day, and weather by operating third information terminal 120, and third information terminal 120 accepts the entry of such specification information from the delivery person (S52). It is sufficient if the specification information is information that specifies at least one of the following conditions: a season, a day of the week, a time period of a day, or weather. The season may be specified in terms of months on the calendar, or may be specified using four seasons such as spring, summer, fall, or winter.

Next, third information terminal 120 transmits, to server apparatus 50, the request information including the identification information and the specification information that have been entered (S53). When the request information is obtained by obtainer 55, outputter 58 of server apparatus 50 identifies the ID of control apparatus 40 associated with the identification information included in the request information, by referring to the user registration information stored in storage 53 (S54).

Next, by referring to the determination result information stored in storage 53, outputter 58 statistically processes the determination result that corresponds to the conditions specified by the specification information included in the request information, among the results of determination of the presence or absence of the user associated with the ID of control apparatus 40 that has been identified (S55). Outputter 58, for example, calculates the probability that the user is present in building 80 (in other words, the probability of absence) under the corresponding conditions from past results of determination (i.e., past determination record) corresponding to the conditions (a season, a day of the week, a time period of a day, and weather) specified by the specification information. Outputter 58 then generates and outputs presence/absence related information that indicates the probability of the presence of the user (S56). In other words, outputter 58 outputs the presence/absence related information that statistically indicates the presence or absence of the user in building 80 under the conditions specified by the specification information.

Figure 12:
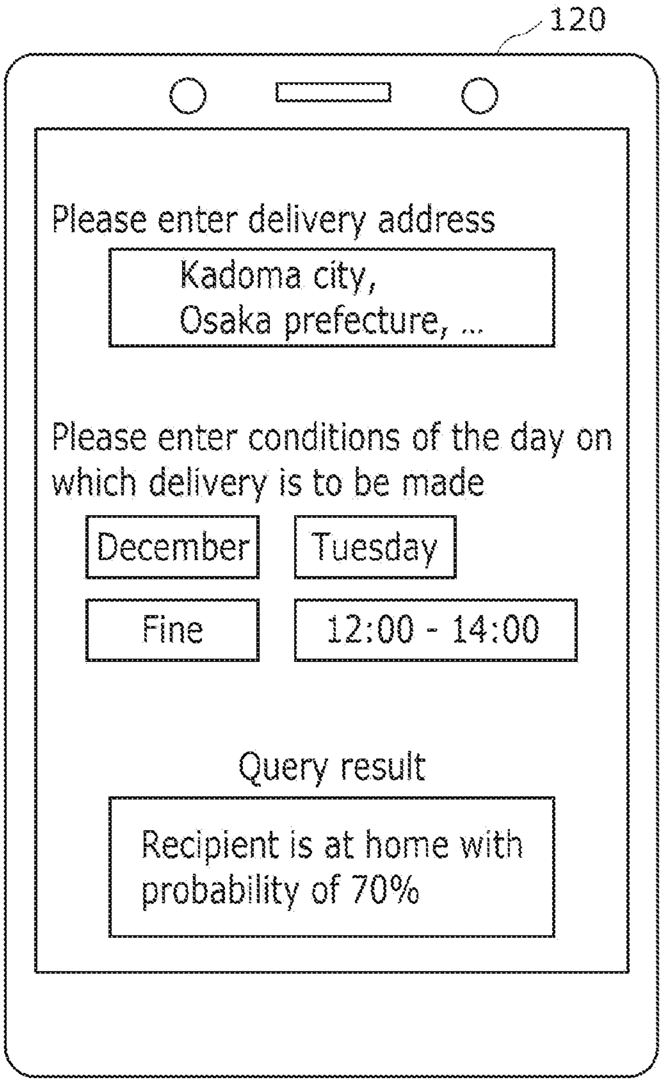
FIG. 12 is a diagram illustrating an example of an image displayed on a third information terminal in Example 2 of the information providing operation.

Next, communication section 52 transmits the presence/absence related information that has been output by outputter 58, to third information terminal 120 (S57). When the presence/absence related information is received, third information terminal 120 displays the probability of the presence of the user indicated by the presence/absence related information on the display section included in third information terminal 120 (S58). FIG. 12 is an example of an image displayed on the display section included in third information terminal 120.

As described above, information processing system 30 is capable of providing third information terminal 120 with presence/absence related information that statistically indicates the presence or absence of the user in building 80 under at least one of the conditions including a season, a day of the week, a time period of a day, or weather specified by the specification information.

Example 3 of Information Providing Operation

Figure 13:
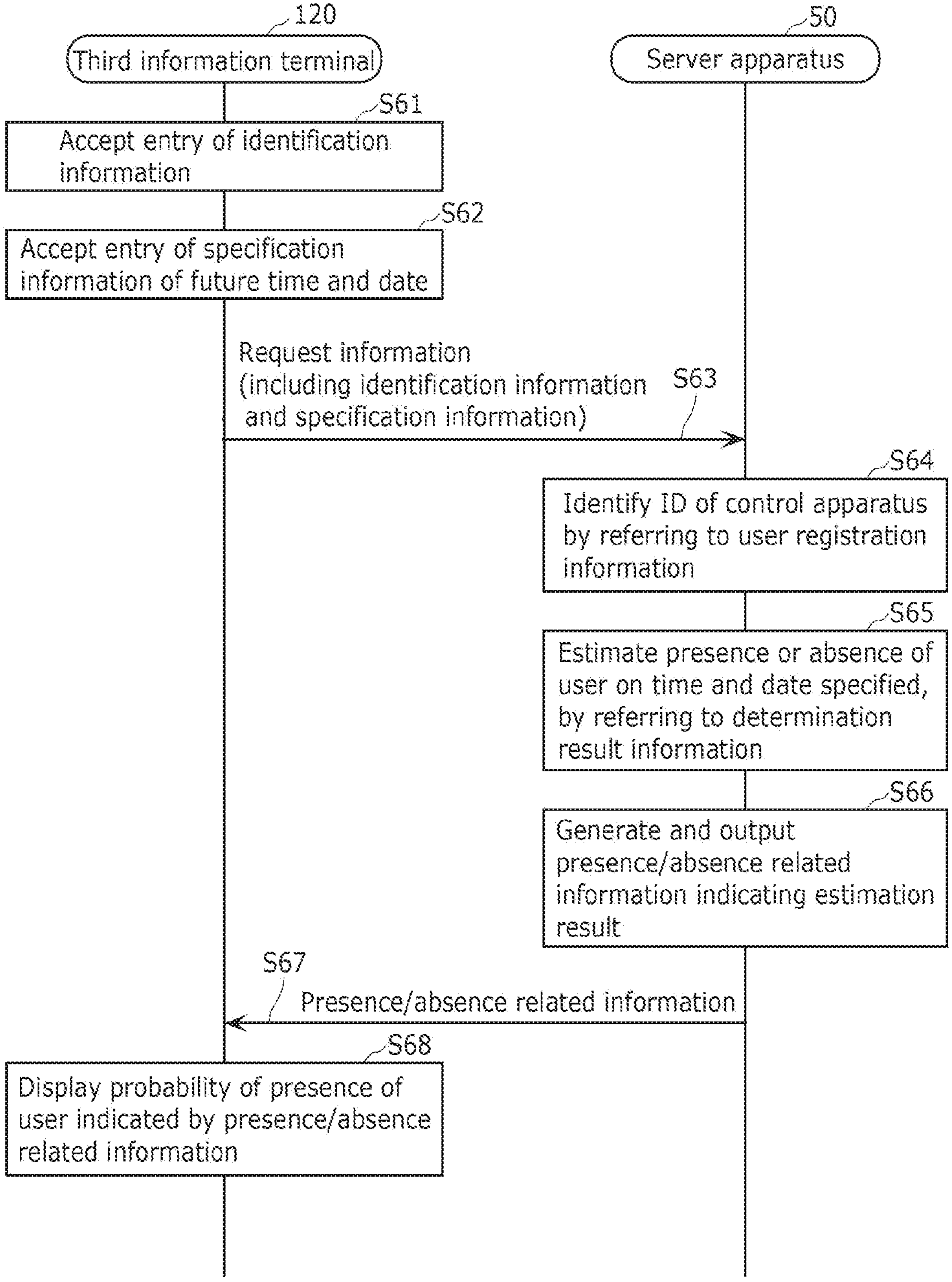
FIG. 13 is a sequence diagram of Example 3 of the information providing operation of the information processing system according to the embodiment.

In the information providing operation of information processing system 30, presence/absence related information indicating the estimated result of the presence or absence of the user under the specified conditions may be output. FIG. 13 is a sequence diagram of Example 3 of such information providing operation performed by information processing system 30.

First, the delivery person of the delivery service provider enters at least one piece of identification information by operating third information terminal 120, and third information terminal 120 accepts the entry of such identification information from the delivery person (S61). In addition, the delivery person of the delivery service provider enters specification information specifying a future time and date by operating third information terminal 120, and third information terminal 120 accepts the entry of such specification information from the delivery person (S62). Next, third information terminal 120 transmits, to server apparatus 50, the request information including the identification information and the specification information that have been entered (S63).

When the request information is obtained by obtainer 55, outputter 58 of server apparatus 50 identifies the ID of control apparatus 40 associated with the identification information included in the request information, by referring to the user registration information stored in storage 53 (S64).

Next, by referring to the determination result information stored in storage 53, outputter 58 estimates the determination result on the time and date specified by the specification information included in the request information, based on the past estimated results of the user associated with the ID of control apparatus 40 that has been identified (S65). Outputter 58 calculates, for example, the probability of the presence of the user (in other words, the probability of absence) on the day of week and the time period of a day that have been specified by the specified information, based on the past determination results on the same day of week and the time period of a day as the time and date specified by the specified information, for example. Outputter 58 then estimates that the user is present at the specified time and date if the probability of the presence of the user is greater than or equal to a predetermined probability (e.g., 80%), and that the user is not present at the specified time and date if the probability of the presence of the user is less than the predetermined probability. It should be noted that such an estimation algorithm is an example, and other estimation algorithms based on past determination results may be used.

Next, outputter 58 generates and outputs presence/absence related information that indicates the estimated result (S66). In other words, outputter 58 outputs presence/absence related information indicating the estimated result of the presence or absence of the user in building 80 on a future time and date specified by the specification information.

Figure 14:
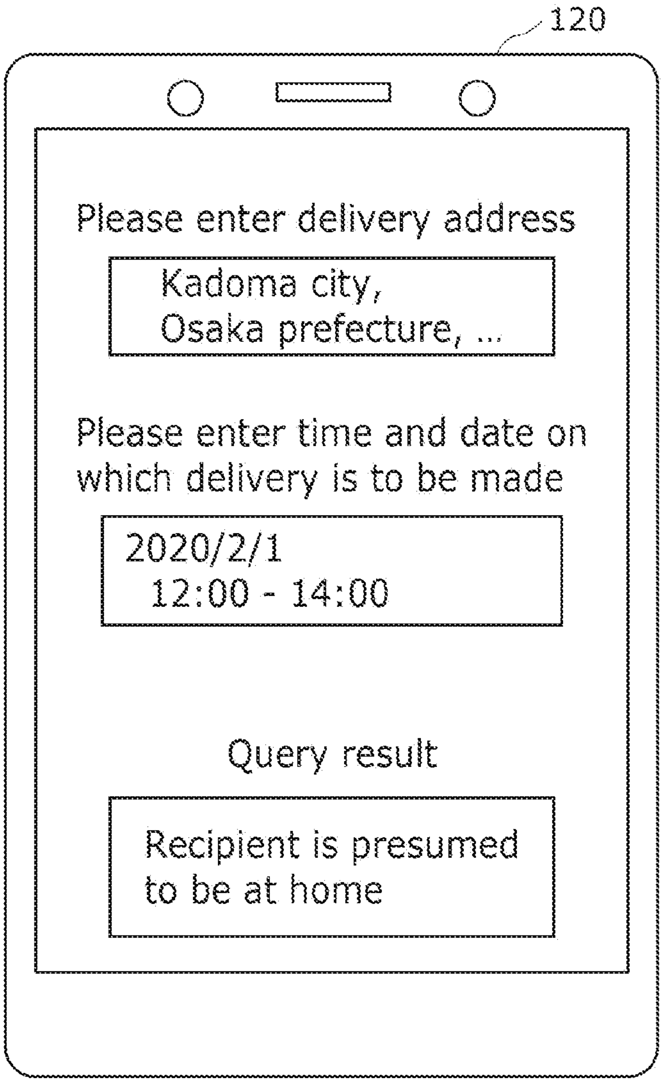
FIG. 14 is a diagram illustrating an example of an image displayed on a third information terminal in Example 3 of the information providing operation.

Next, communication section 52 transmits the presence/absence related information that has been output by outputter 58, to third information terminal 120 (S67). When the presence/absence related information is received, third information terminal 120 displays the estimated result indicated by the presence/absence related information on the display section included in third information terminal 120 (S68). FIG. 14 is a diagram illustrating an example of an image displayed on the display section included in third information terminal 120.

As described above, information processing system 30 is capable of providing third information terminal 120 with presence/absence related information that indicates the estimated result of the presence or absence of the user in building 80 on the time and date specified by the specification information.

Example 4 of Information Providing Operation

Figure 15:
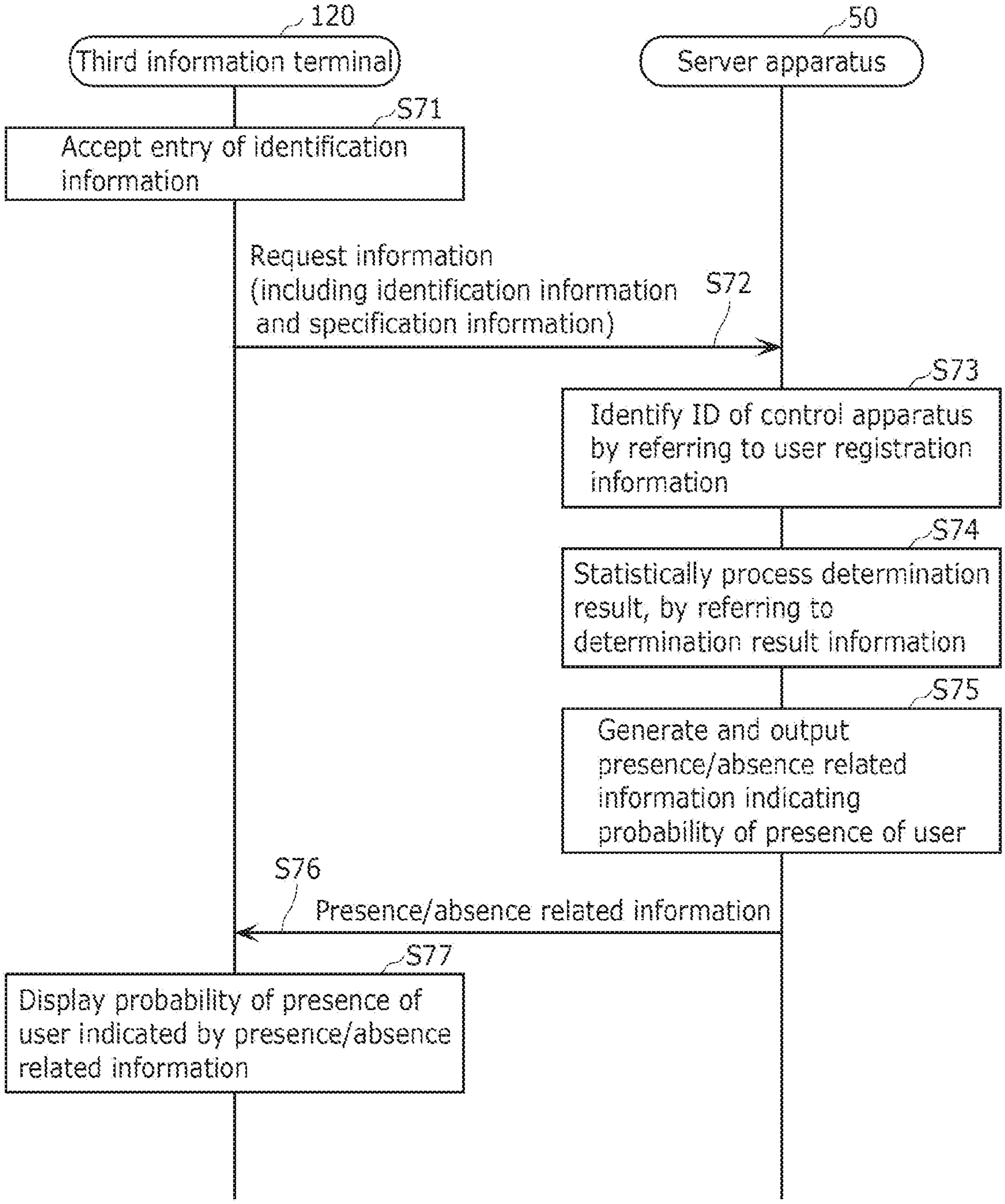
FIG. 15 is a sequence diagram of Example 4 of the information providing operation of the information processing system according to the embodiment.

In Examples 1 to 3 of the above-described information providing operation, the identification information has been information to identify the user or building 80 individually. However, the identification information may be attribute identification information to identify the attribute of the user or building 80. FIG. 15 is a sequence diagram of Example 4 of the information providing operation of such information processing system 30.

First, the delivery person of the delivery service provider enters attribute identification information by operating third information terminal 120, and third information terminal 120 accepts the entry of such attribute identification information from the delivery person (S71).

Attribute identification information is information that identifies attribute information, such as an area of residence, age, and gender. Specifically, the attribute identification information is information to which a plurality of users are applicable, such as “resides in XX city”. Attribute identification information, in other words, is identification information for grouping the results of determination of a plurality of users based on attribute information.

Third information terminal 120 transmits, to server apparatus 50, the request information including the attribute identification information that has been entered (S72). When the request information is obtained by obtainer 55, outputter 58 of server apparatus 50 identifies the ID of control apparatus 40 of the user whose attribute information is identified by the attribute identification information included in the request information, by referring to the user registration information stored in storage 53 (S73).

Next, by referring to the determination result information stored in storage 53, outputter 58 statistically processes the result of determination of the presence or absence of the user associated with the ID of control apparatus 40 that has been identified (S74). Outputter 58, for example, calculates the probability of the presence of the user having the above-described attribute (in other words, the probability of absence), based on the past result of determination (i.e., past determination record) of the plurality of users each having the attribute identified by the attribute identification information.

Outputter 58 then generates and outputs presence/absence related information indicating the probability of the presence of the user having the attribute identified by the attribute identification information (S75). In other words, outputter 58 outputs presence/absence related information that statistically indicates the presence or absence of a plurality of users having attributes identified by the attribute identification information.

Figure 16:
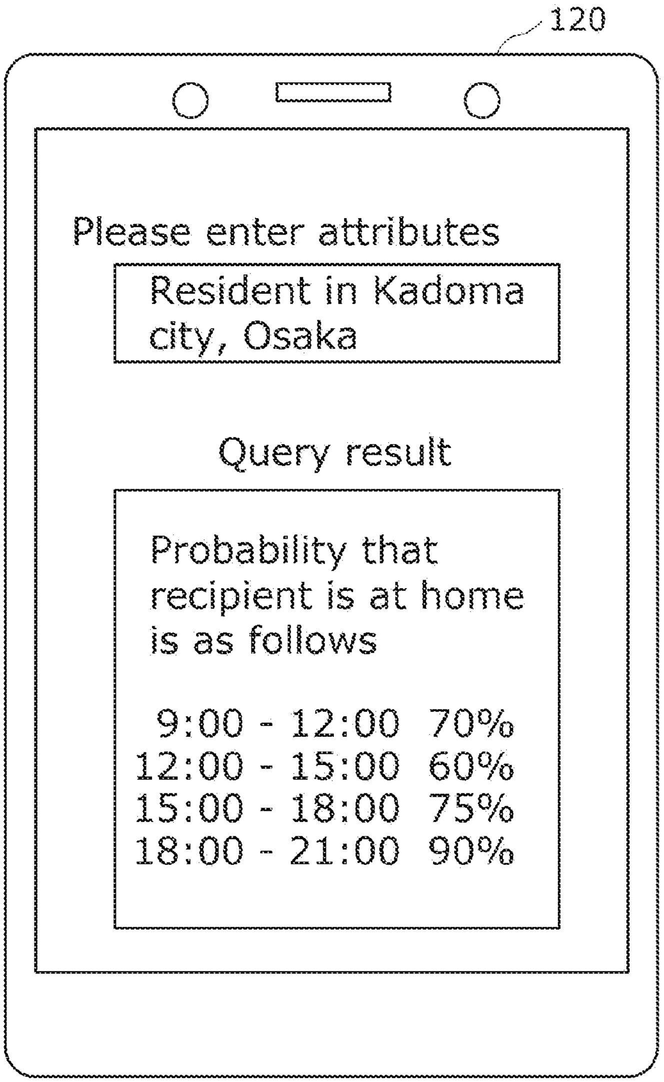
FIG. 16 is a diagram illustrating an example of an image displayed on a third information terminal in Example 4 of the information providing operation.

Next, communication section 52 transmits the presence/absence related information that has been output by outputter 58, to third information terminal 120 (S76). When the presence/absence related information is received, third information terminal 120 displays the probability of the presence of the user indicated by the presence/absence related information on the display section included in third information terminal 120 (S77). FIG. 16 is an example of an image displayed on the display section included in third information terminal 120.

As described above, information processing system 30 is capable of outputting presence/absence related information that statistically indicates the presence or absence of a plurality of users having the attributes identified by the attribute identification information.

Variation of Information Providing Operation

In Examples 1 through 4 of the above-described information providing operation, server apparatus 50 has provided the presence/absence related information to third information terminal 120 (e.g., smartphone, etc.). However, server apparatus 50 may provide presence/absence related information to a server apparatus used by the delivery service provider. In this case, server apparatus 50 stores the determination result information in storage 53, and the server apparatus which is used by the delivery service provider stores the user registration information in a storage included in the server device.

When a delivery person of the delivery service provider enters a delivery address, etc. into third information terminal 120, the server apparatus used by the delivery service provider receives, from third information terminal 120, the information including the delivery address, etc. that have been entered, and identifies the ID of control apparatus 40 corresponding to the delivery address, etc., by referring to the user registration information. Then, the server apparatus used by the delivery service provider transmits, to server apparatus 50, the request information including the ID of control apparatus 40 as identification information, thereby receiving the presence/absence related information from server apparatus 50 as a response to the request information and providing the received presence/absence related information to third information terminal 120.

In addition, in Examples 1 through 4 of the above-described information providing operation, the recipient of the presence/absence related information has been the delivery service provider, but the presence/absence related information may be provided to other service providers. For example, the presence/absence related information may be provided to a security provider and used for machine guarding, etc. In addition, the presence/absence related information may also be used for marketing and other purposes.

Advantageous Effects, Etc

As described above, information processing system 30 includes obtainer 55 that obtains request information for requesting presence/absence related information indicating presence or absence of a user in building 80; and outputter 58 that outputs, in response to the request information obtained, the presence/absence related information identified by identification information included in the request information.

Information processing system 30 as described above is capable of providing information related to the presence or absence of a user in building 80.

In addition, for example, outputter 58 outputs the presence/absence related information indicating the presence or absence of the user in building 80 at a timing when the request information is obtained.

Information processing system 30 as described above is capable of providing information related to the presence or absence of a user in building 80 substantially in real time.

In addition, for example, the request information includes specification information that specifies, as a condition, at least one of a season, a day of week, a time period of a day, or weather.

Outputter 58 outputs the presence/absence related information statistically indicating the presence or absence of the user in building 80 under the condition specified by the specification information.

Such information processing system 30 as described above is capable of providing information related to the presence or absence of a user in building 80 which can be obtained by statistically processing the data (the result of determination of the presence or absence of the user) that corresponds to the condition that has been specified.

In addition, for example, the request information includes specification information that specifies a future time and date. Outputter 58 outputs the presence/absence related information indicating an estimated result of the presence or absence of the user in building 80 on the future time and date specified by the specification information.

Such information processing system 30 as described above is capable of providing information related to the presence or absence of a user in building 80 in the future.

In addition, for example, the identification information is attribute identification information for identifying an attribute of the user or the building. Outputter 58 outputs the presence/absence related information statistically indicating presence or absence of a plurality of users each having an attribute identified by the attribute identification information, the plurality of users each being the user.

Such information processing system 30 as described above is capable of providing information related to the presence or absence of a user in building 80 which can be obtained by statistically processing the data (the result of determination of the presence or absence of the user) that corresponds to the attribute indicated by the attribute identification information.

In addition, for example, information processing system 30 includes: determination section 57 that determines whether the user is present in building 80 based on first information and second information, the first information indicating a detection result of open/close sensor 20 that is disposed at a doorway of building 80 and detects opening or closing of door 81, the second information indicating a detection result of human detecting sensor 25 that is disposed in building 80; and storage 53 in which a result of the determination by determination section 57 is stored. Outputter 58 outputs the presence/absence related information based on the result of the determination stored in storage 53.

Such information processing system 30 as described above is capable of determining whether a person is present in building 80, based on the results of detection performed by open/close sensor 20 and human detecting sensor 25.

In addition, an information processing method executed by a computer such as information processing system 30 includes: obtaining request information for requesting presence/absence related information indicating presence or absence of a user in building 80; and outputting, in response to the request information obtained, the presence or absence related information identified by identification information included in the request information.

With such information processing method as described above, it is possible to provide information related to the presence or absence of a user in building 80.

Other Embodiments

Although the embodiment has been described thus far, the present invention is not limited to the above-described embodiment.

For example, in the above-described embodiment, the information processing system has been applied to a watching over system, but the information processing system may be applied to systems other than the watching over system. In addition, the specific content of the notification information and the intended use of the notification are not particularly limited. For example, the information processing system may be applied to machine guarding (security system).

In addition, in the above-described embodiment, the information processing system has been implemented by a plurality of apparatuses, but the information processing system may be implemented by a single apparatus (e.g., either a control apparatus or a server apparatus). When the information processing system is implemented by a plurality of apparatuses, the structural components included in the information processing system may be distributed to the plurality of apparatuses in any manner. For example, in the above-described embodiment, some or all of the processes performed by the server apparatus may be performed by the control apparatus.

In addition, the method of communication between the apparatuses in the foregoing embodiment is not specifically limited. In addition, a relay device which is not illustrated in the diagrams may intervene in the communication between the apparatuses.

In addition, in the above-described embodiment, processing performed by a specific processing unit may be performed by a different processing unit. Furthermore, the order of a plurality of processes may be rearranged. Alternatively, the plurality of processes may be performed in parallel.

In addition, each of the structural components in the above-described embodiment may be implemented by executing a software program suitable for the structural components. Each of the structural components may be implemented by means of a program executing unit, such as a central processing unit (CPU) and a processor, reading and executing the software program recorded on a recording medium such as a hard disk or a semiconductor memory.

In addition, each of the structural components may be implemented by hardware. For example, each of the structural components may be a circuitry (or an integrated circuit). The circuitries may be configured as a single circuitry as a whole or may be mutually different circuitries. In addition, the circuitries may each be a general-purpose circuit, or may be a dedicated circuit.

In addition, the generic or specific aspects of the present invention may be implemented by a system, a device, a method, an integrated circuit, a computer program, or a computer-readable recording medium such as a compact disc read only memory (CD-ROM). Alternatively, the generic or specific aspects of the present invention may be implemented by any combination of systems, devices, methods, integrated circuits, computer programs, and recording medium.

For example, the present invention may be implemented as a control apparatus or a server apparatus. Alternatively, the present invention may be implemented as a program for causing a computer to execute the information processing method according to the foregoing embodiment. The present invention may be implemented as a non-transitory computer-readable recording medium on which the above-described program is stored.

It should be noted that the present invention also includes other forms in which various modifications apparent to those skilled in the art are applied to the embodiment or forms in which structural components and functions in the embodiment are arbitrarily combined within the scope of the present invention.

The invention claimed is:

1. An information processing system comprising:

an obtainer that obtains request information for requesting presence/absence related information indicating presence or absence of a user in a building;

an outputter that outputs, in response to the request information obtained, the presence/absence related information identified by identification information included in the request information;

a determination section that determines whether the user is present in the building based on first information and second information, the first information indicating a detection result of an open/close sensor that is disposed at a doorway of the building and detects opening or closing of a door, the second information indicating a detection result of a human detecting sensor that is disposed in the building; and a storage in which a result of the determination by the determination section is stored, wherein:

the outputter outputs the presence/absence related information based on the result of the determination stored in the storage, the determination section:

identifies a first timing at which the door transitions from an opened state to a closed state and a second timing at which the door transitions to the opened state next, based on the first information obtained;

determines that the user is present in the building when the second information obtained indicates that a total number of times the human detecting sensor has reacted during a first period from the first timing to a third timing which is before the second timing is greater than or equal to a predetermined number of times, the predetermined number of times being two or more times;

determines that the user is not present in the building when the second information obtained indicates that the human detecting sensor has reacted at least once during the first period and the total number of times the human detecting sensor has reacted during the first period is less than the predetermined number of times, and when third information indicating a detection result of the human detecting sensor during a second period indicates that the total number of times the human detecting sensor has reacted is greater than or equal to the predetermined number of times, correcting a result of determination that the user is not present in the building to a result of determination that the user is present in the building, the second period being from determining that the user is not present in the building to the second timing.

2. The information processing system according to claim 1, wherein the outputter outputs the presence/absence related information indicating the presence or absence of the user in the building at a timing when the request information is obtained.

3. The information processing system according to claim 1, wherein the request information includes specification information that specifies, as a condition, at least one of a season, a day of week, a time period of a day, or weather, and the outputter outputs the presence/absence related information statistically indicating the presence or absence of the user in the building under the condition specified by the specification information.

4. The information processing system according to claim 1, wherein the request information includes specification information that specifies a future time and date, and the outputter outputs the presence/absence related information indicating an estimated result of the presence or absence of the user in the building on the future time and date specified by the specification information.

5. The information processing system according to claim 1, wherein the identification information is attribute identification information for identifying an attribute of the user or the building, and the outputter outputs the presence/absence related information statistically indicating presence or absence of a plurality of users each having an attribute identified by the attribute identification information, the plurality of users each being the user.

6. An information processing method comprising:

obtaining request information for requesting presence/absence related information indicating presence or absence of a user in a building;

determining whether the user is present in the building based on first information and second information, the first information indicating a detection result of an open/close sensor that is disposed at a doorway of the building and detects opening or closing of a door, the second information indicating a detection result of a human detecting sensor that is disposed in the building;

storing, in a storage, a result of the determination by the determination section is stored; and outputting, in response to the request information obtained, the presence or absence related information identified by identification information included in the request information based on the result of the determination stored in the storage, wherein the determining includes:

identifying a first timing at which the door transitions from an opened state to a closed state and a second timing at which the door transitions to the opened state next, based on the first information obtained;

determining that the user is present in the building when the second information obtained indicates that a total number of times the human detecting sensor has reacted during a first period from the first timing to a third timing which is before the second timing is greater than or equal to a predetermined number of times, the predetermined number of times being two or more times;

determining that the user is not present in the building when the second information obtained indicates that the human detecting sensor has reacted at least once during the first period and the total number of times the human detecting sensor has reacted during the first period is less than the predetermined number of times; and when third information indicating a detection result of the human detecting sensor during a second period indicates that the total number of times the human detecting sensor has reacted is greater than or equal to the predetermined number of times, correcting a result of determination that the user is not present in the building to a result of determination that the user is present in the building, the second period being from determining that the user is not present in the building to the second timing.

7. A non-transitory computer-readable recording medium for use in a computer, the recording medium having a computer program recorded thereon for causing the computer to execute the information processing method according to claim 6.

8. The information processing system according to claim 1, wherein:

the open/close sensor includes at least one of a magnetic sensor attached to the door or a sensor utilizing a radio wave attached to the door, and the human detecting sensor includes at least one of a pyroelectric motion sensor installed at an entrance of the building or an ultrasonic motion sensor installed at the entrance of the building.

9. The information processing method according to claim 6, wherein:

the open/close sensor includes at least one of a magnetic sensor attached to the door or a sensor utilizing a radio wave attached to the door, and the human detecting sensor includes at least one of a pyroelectric motion sensor installed at an entrance of the building or an ultrasonic motion sensor installed at the entrance of the building.

* * * * *